2,927,466

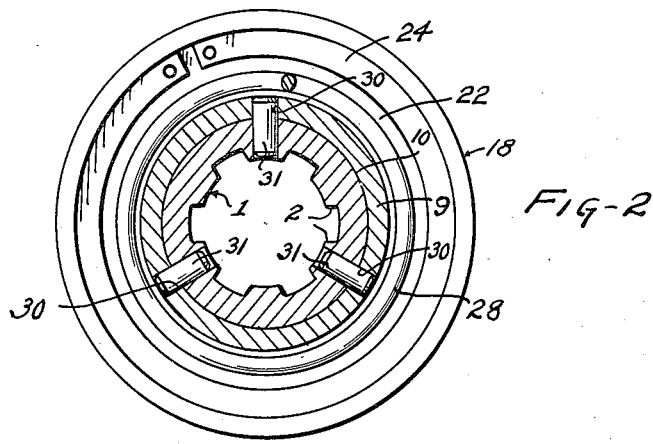
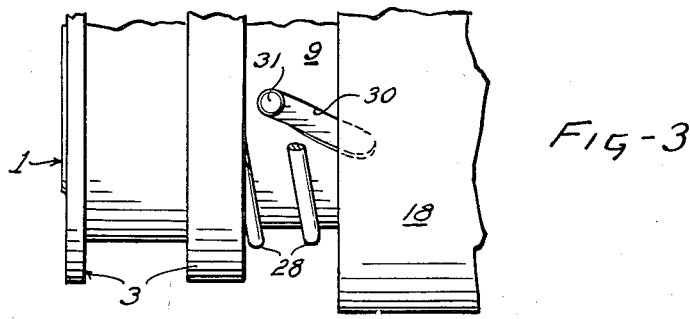
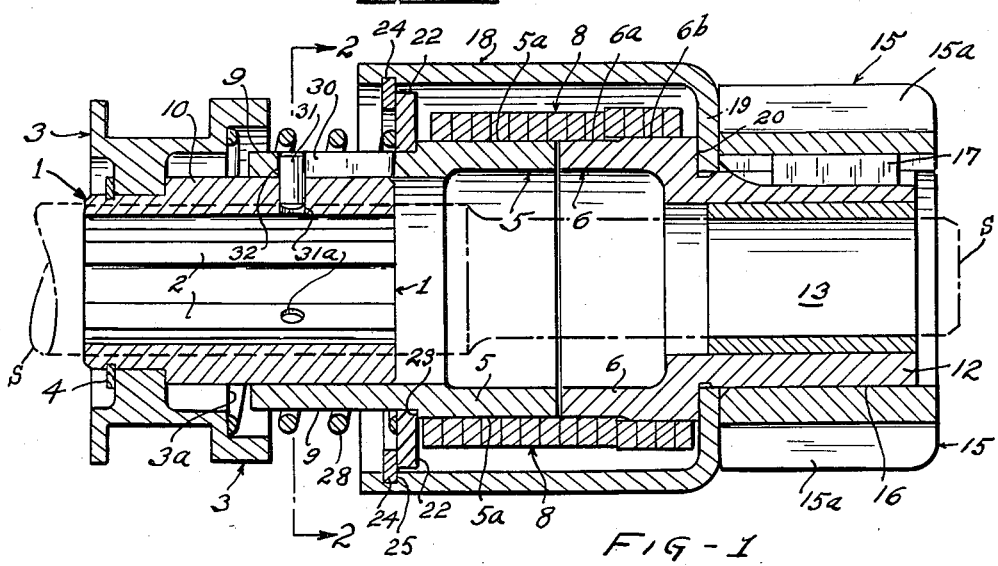
March 8, 1960   D. R. TOMKO   2,927,466
ENGINE STARTER MECHANISMS
Filed Aug. 28, 1957
INVENTOR.
DONALD R. TOMKO
BY
ATTORNEY United States Patent Office 2,927,466
Patented Mar. 8, 1960

ENGINE STARTER MECHANISMS

Donald R. Tomko, Cleveland, Ohio, assignor to Curtiss-Wright Corporation, a corporation of Delaware Application August 28, 1957, Serial No. 680,841

3 Claims. (Cl. 74—6)

The invention relates principally to an improved construction of an overrunning clutch and starter pinion assembly or unit for use in electric or other motor driven starter mechanisms of the type usually identified as manual shift or solenoid shift engine starters or wherein the starter pinion is moved into mesh with the engine flywheel gear prior to energizing the starter motor. An example of the type of mechanism involved is shown in a patent to W. C. Starkey et al., 2,277,795 issued March 31, 1942. Such mechanism units, as is well known, are slidably keyed to the starter motor output shaft and shifted by a suitable yoke or collar along the axis of the shaft until the starter pinion teeth either collide with or go into mesh with the engine flywheel gear, and the shifting means then usually energizes the starter motor only after the pinion and gear teeth are fully in mesh. The overrunning clutch portion of the mechanism is required in order to prevent imposition of destructive strains on the starter unit and motor between the time when the engine begins to operate on its own power and the time when the pinion has been moved out of mesh with the engine gear.

The present invention aims to provide several improved features in a mechanism such as outlined above, as will be fully explained below in the course of describing the construction shown in the accompanying drawing, wherein:

Fig. 1 is a central longitudinal sectional assembly view of the unit in one form.

Fig. 2 is a transverse sectional view taken along the line 2—2 of Fig. 1.

Fig. 3 is a fragmentary detailed view showing principally a sleeve portion of an input drum member of the overrunning clutch portion of the mechanism.

In Figs. 1 and 2 a suitable shaft adapter 1 is provided with axial spline formations 2 whereby the entire unit hereof can be slidably supported on and driven by a suitable output shaft S of the motor, shown by dot and dash lines in Fig. 1 only. A shift collar 3, for engagement by a suitable shifter fork or yoke, not shown, is mounted on the shaft adapter 1 and secured against axial movement relative thereto as by a snap ring 4 so that the collar 3 and shaft adapter 1 constitute a self-contained shift collar assembly or sub-assembly of the starter unit.

The overrunning clutch comprises as shown an input drum member 5 of generally cylindrical form, an output drum member 6 of similar form and a contracting-to-grip helical friction clutch spring 8 in surrounding and bridging relation to external generally cylindrical surfaces of the two drum members. The clutch spring is preferably of the full floating type which is to say that its coils are preloaded for self-energization and gripping on the two drum members 5 and 6 but are otherwise unconnected therewith.

Input drum member 5 has a sleeve portion 9 slidable on a cylindrical external surface portion 10 of the shaft adapter 1. The output drum member 6 has a reduced diameter sleeve portion 12 extending oppositely from the sleeve portion 9, and the portion 12 has a suitable bearing bushing 13 for radial support as on the motor drive shaft, not shown. The starter pinion 15 is supported preferably by a press fit over reduced diameter surface 16 of the output drum sleeve portion 12 and is additionally positively secured to the output drum as by a suitable key 17. A protective and/or lubricant containing shell 18 of generally cylindrical form surrounds the clutch spring 8 and has an inwardly turned integral flange portion 19 which is held against an axial shoulder 20 on the output clutch drum member 6 when the pinion 15 is press fitted over the surface 16. The opposite end of the sleeve 18 extends beyond the clutch spring 8 and is provided with a suitable closure ring 22 which is secured in sliding contact with an axial shoulder surface 23 on the drum member 5 as by a removable snap ring 24 in an internal groove 25 of the sleeve 18. Since the clutch drum member 5 has to be relatively hard to serve its purpose the ring or closure plate 22 is preferably of relatively soft material, for instance Phosphor bronze.

When the non-rotating assembly comprising the shaft adapter 1 and shift collar 3 is slid to the right for the purpose of engaging the pinion teeth 15a and the engine gear, and the teeth 15a are in abutting alignment with teeth of the engine gear, said assembly 1, 3 then slides further into the interior of the input clutch drum member 5 compressing a jump spring 28 shown with its opposite ends resting respectively on a surface 3a of the shift collar and the leftwardly exposed surface of the bearing ring 22. A known manner of utilizing the resulting relative axial movement between a clutch assembly and an input driving part such as shaft adapter 1 in order to force the starter pinion to turn sufficiently forward to go into mesh with the engine gear is to provide a helical spline connection between counter parts of shaft adapter 1 and clutch drum member 5 hereof. The formation of helical spline teeth with sufficient accuracy for free sliding movement without excessive backlash between such parts as 1 and sleeve 9 of drum member 5 is extremely expensive.

An important feature of the present construction is the provision of equally circumferentially spaced generally helical slots as at 30 in the sleeve portion 9 of drum member 5 and the provision of an equal number of radial pins 31 in the wall of the shaft adapter 1 and which extend outwardly into the slots 30 for free sliding movement along the slots as necessary in order to compress the spring 28 when the pinion and gear teeth collide in the initial starting operation. The pins by engaging end shoulders 32 of the slots 30 also overcome the necessity for providing a special shoulder arrangement between the parts such as drum member 5 and shaft adapter 1 in order to limit the outward movement of the clutch and pinion assembly away from the shift collar and shaft adapter assembly. The pins 31 are normally held by the spring 28 in abutment with the end shoulders 32 of slots 30, thereby limiting the outward axial movement of the clutch and pinion assembly (5, 6, 8, and 15) away from the shift collar 10. During assembly of the starter mechanism generally, and before the shift collar and spring 28 are placed in their illustrated positions the outer peripheral surface of the shaft adapter is exposed through the slots 30, wherefore it is an easy matter to press the pins inwardly through the slots for tight press fitting engagement with holes or sockets 31a in the shaft adapter. Thereafter the shift collar and spring are secured as will be apparent by the snap ring 4.

Aside from using the pinion 15 in order to tightly secure the shell 18 in place, the pinion 15 is made separately from the output clutch drum member 6 in order that its teeth may be formed by ordinary or inexpensive hobbing methods and in order that the drum member 6 with its extension 12 may be made of relatively soft material and easily machined. When the drum member 6 is of relatively soft material it is necessary that the overrun of the coils of spring 8 shall occur adjacent the input drum surface 5a rather than on, for example, the output drum surface 6a or 6b. In the present construction the drum surfaces 5a and 6a are of equal diameter as is desirable for proper spring clutch functioning. The clutch spring as manufactured has all its coils of uniform diameter (usually ground). Thus, in order to secure a greater preloading of such spring coils on the output drum member 6 the surface 6b is made slightly larger than surface 6a, thus larger than input drum surface 5a. The overrun will necessarily occur between the spring coils associated with drum surface 5a but cannot occur on the output drum surfaces or those connected with the starter pinion 15. Incidentally, the overrun of spring coils on input drum surface 5a is relieved somewhat by centrifugal force acting on the associated spring coils.

It will be seen that the use of relatively soft material for the output clutch drum member 6 as compared to the material used for the pinion and the material used for input drum member 5 not only makes the output drum member 6 inexpensive to machine or form but also facilitates press fitting of the pinion 15 over the sleeve portion 12 of the output drum member. As already noted, by making the pinion 15 a part separate from the drum member 6 the pinion can be made on a gear hob while minimizing the axial length of the spring clutch and pinion assembly.

I claim:

1. A self-contained engine starting unit for coupling an output member of a starter motor to a gear of an engine, which unit is of the type wherein a pinion of the starting unit is moved manually or otherwise into meshing relationship to the engine gear before the starter motor is energized, said unit comprising a shift collar assembly including a member adapted to be slidably keyed or splined to such motor output member so as to be turned thereby in the engine starting direction whenever the motor is energized, an overrunning clutch comprising coaxial relatively rotatable input and output clutch drum members and frictionally acting means strongly coupling the drum members for rotation of the output drum member by the input drum member in the engine starting direction only, a starter pinion operatingly rigid with the output drum member, said input clutch drum member and said member of the shift collar assembly having sleeve portions in mutually telescoping slidable relationship, a spring interposed between the shift collar assembly and input drum member and arranged normally to hold the clutch and starter pinion in extended position relative to the shift collar assembly while permitting the output clutch member and the pinion to be temporarily arrested by the engine gear in event of disalignment of gear and pinion teeth, and means permitting limited relative axial movement between the shift collar assembly and the clutch, said means including a series of generally helical slots in the radially outward sleeve portion, said slots being axially closed in a direction away from the pinion toward the shift collar assembly in positions providing abutment surfaces facing axially in the opposite direction, and said means further including pins fixed to the radially inward sleeve portion and slidably occupying respective slots, at least one of the pins being normally held in abutment with the axial abutment surface of its respective slot by the spring, whereby, in event of such tooth disalignment, the pinion while stopped by the gear teeth will be turned as a function of further axial movement of the shift collar assembly toward the pinion to enable meshing of the pinion and gear teeth.

2. The engine starter unit according to claim 1, wherein the clutch drum members have generally cylindrical endwise axially adjacent drum surfaces of approximately equal diameter and the frictionally acting means is a helical metal coil member bridging the drum surfaces and preloaded radially against the input drum surface for self-energization thereon, said coil member being relatively more heavily preloaded against the output drum surface for self energization thereon, whereby overrun will be caused to occur only between the coil member and the input drum member.

3. A self contained engine starting unit for coupling an output member of a starter motor to a gear of an engine, the unit being of the type wherein a pinion of the starting unit is moved manually or otherwise into meshing relationship to the engine gear before the starter motor is energized, the unit comprising a shift collar member connected to turn with the motor output member, while being slidable axially relative thereto, an overrunning coil clutch comprising relatively axially adjacent input and output clutch drum members on a common axis with the shift collar member and a helical coil bridging drum surfaces of the respective drum members and self energizing thereon for torque transmission in one direction, cam and spring means coupling the shift collar member to the input clutch drum member and arranged to enable axial movement of the input drum member and the shift collar member relatively toward each other while producing relative turning movement of the shift collar member and drum member about the common axis, a generally cylindrical sleeve surrounding the clutch coil coaxial therewith and having an inturned flange adjacent a circular axial shoulder of the output drum member, axial thrust bearing means removably coupled with the sleeve opposite its flange in a direction toward the shift collar member and bearing against a circular axial shoulder of the input clutch drum member, said output clutch drum member having a reduced diameter portion beyond the first mentioned axial shoulder, and an annular pinion having a circular bore surface secured in press or shrink fitted relationship to a complementary surface of the reduced diameter portion and operative to hold the flange of the sleeve tightly against its associated shoulder, the pinion being additionally secured to said reduced diameter portion of the output clutch drum member, by rigid means radially bridging said portion and the pinion so as to be operative as a torque transmitting key or spline.

References Cited in the file of this patent

UNITED STATES PATENTS

| 1,661,372 | Kroeger | Mar. 6, 1928 |
| 1,707,488 | McGrath | Apr. 2, 1929 |
| 1,721,241 | Whitney | July 16, 1929 |
| 1,820,945 | McGrath | Sept. 1, 1931 |
| 1,846,766 | Starkey et al. | Feb. 23, 1932 |
| 1,892,056 | Jackson et al. | Dec. 27, 1937 |
| 1,974,985 | Cunnius | Sept. 25, 1934 |
| 2,004,650 | Collyear et al. | June 11, 1935 |
| 2,841,988 | Sabatini | July 8, 1958 |